United States Patent Office 2,986,732
Patented May 30, 1961

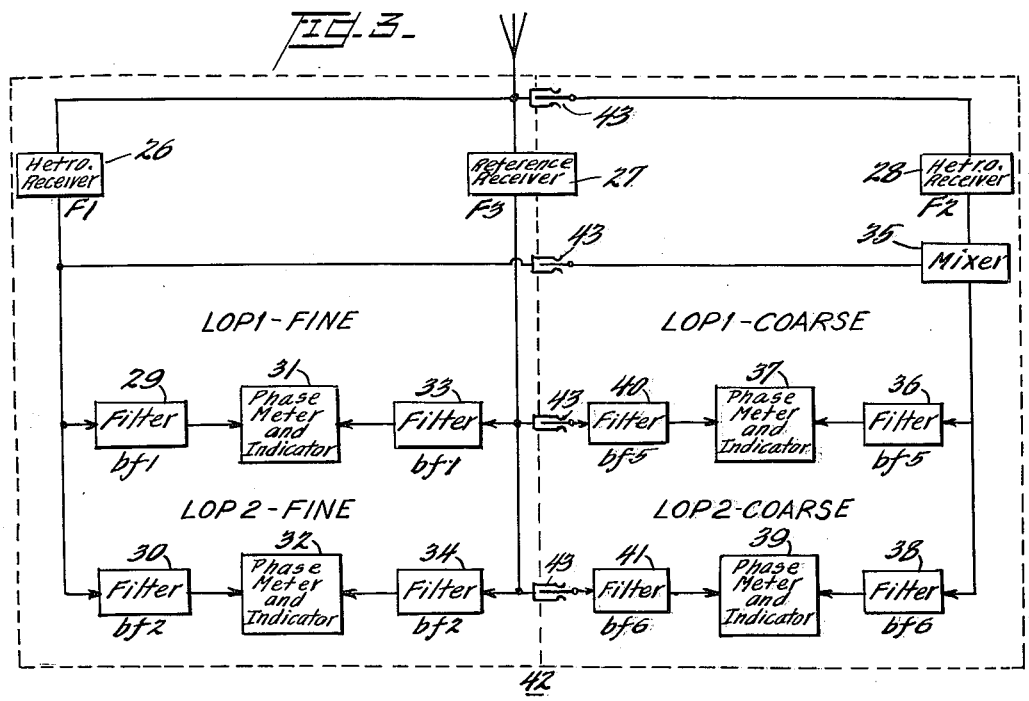
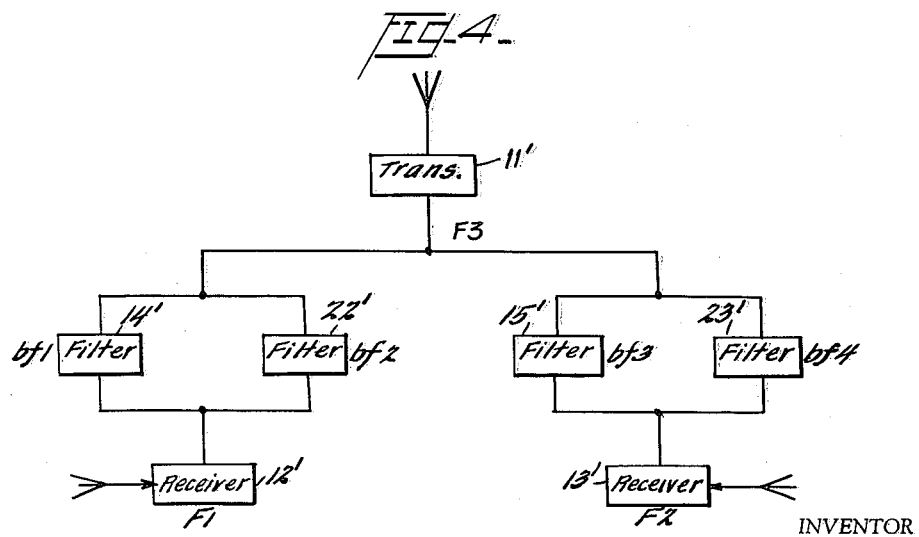

2,986,732
NAVIGATION SYSTEM

Charles E. Marshburn, Silver Spring, Md., assignor to the United States of America as represented by the Secretary of the Navy Filed Mar. 26, 1956, Ser. No. 574,047

10 Claims. (Cl. 343—105)

(Granted under Title 35, U.S. Code (1952), sec. 266)

The invention described herein may be manufactured and used by or for the Government of the United States of America for governmental purposes without the payment of any royalties thereon or therefor.

This invention relates to an electronic navigation system and equipment for providing high accuracy navigation information simultaneously to any number of users within range of the system. More particularly, the invention is directed to improved means and methods enabling a user, preferably a ship, to ascertain geographic position through the use of hyperbolic lines-of-position produced by phase-difference or comparison of a plurality of radio frequency signals.

The novel system utilizes basic principles already established in the art and used in systems known as Lorac, Raydist, Rana, Decca, and others. These systems are also known as heterodyne phase reference type of continuous wave, phase comparison, and hyperbolic navigation systems. Such prior systems operate upon the broad principle that a receiver at a first point on the earth's surface will detect a phase difference between two suitable wave-form signals transmitted from two fixed but separate transmitter points, the phase difference being dependent upon the location of the first point with respect to the other points. Because of practicable considerations, the frequencies of the transmitters are made slightly different so as to provide a beat pattern over the terrain covered by the signals. The pattern consists of so-called lines-of-position, each line having a particular phase-difference along it. In plotted form, a series of spaced hyperbolic lines can be drawn at all points of each of which the phase-difference is zero or null. Along the straight base line between the two transmitter points, these null lines-of-position are equi-distant apart and separated by one-half wave length of the mean radio frequency used. For example, the lane widths of systems operated at frequencies near 5.0, 2.0, 0.5 or 0.1 megacycles are, respectively, approximately 100,250, 1000 or 5000 feet. The width of each lane increases away from the baseline by an amount determined by the distance from the baseline and the angular position with respect to the baseline bisector. Representative of such navigation systems are Patents Nos. 2,148,267 and 2,528,140 to E. A. H. Honore and C. E. Hastings respectively.

The space between each pair of adjacent null lines provides a navigational lane across which the phase difference varies in a half-wave form. Consequently, a vessel knowing (1) the lane in which it is and (2) the phase difference at the point of the lane at which it is at, has a one-dimension fix of its position with respect to the fixed transmitter points and their base line. It will be somewhere on a line-of-position corresponding to the lane and the phase-measurement within the lane which it ascertains with respect to a "reference" from which measurements are taken.

To permit a two dimensional fix to be obtained, a second pattern of lines-of-position may be established angularly related to lines of the first pattern, thereby providing a grid or lattice of crossing lanes and null lines-of-position that can be charted on a chart. Every point covered by the useful area of the chart can be considered to be at the intersection of two lines-of-position, one in each pattern. By ascertaining the phase differences at a point in the earth's surface of the two sets of signals for the two patterns and knowing the crossing lanes, a ship can obtain a fix of its location with the aid of the proper chart.

In order to produce the two families of intersecting hyperbolic lines-of-position and lanes, that is, the lattice required for a navigational fix, at least three heterodyning carrier stations must be used. The three heterodyning carrier stations are usually installed so that the base lines between the "center" station and each "end" station form a wide mouth V, each line being a side of the V. The center and end stations form the foci of the two families or patterns of hyperbolic lines-of-position. As a further refinement, systems are provided having patterns with null lines which are relatively widely spaced, thereby providing Coarse lanes, and with null lines which are relatively closely spaced and provide a multiple number of Fine lanes within each Coarse lane.

Position fixing patterns of hyperbolic lines-of-position to produce Fine lanes can be generated by geographically separated stations that transmit heterodyning radio frequency carriers in one radio frequency channel and stations that transmit in another radio frequency channel "constant phase" reference signals related to the heterodynes or beat frequencies. In the navigation receiver on the vessel seeking a fix, measurement of the phase of the beat frequency obtained by detecting the heterodyned carriers versus the phase of the corresponding beat frequency signal obtained by detecting the reference station signal serves to identify a hyperbolic line-of-position on the appropriate chart.

Known systems use different arrangements of the reference stations. In one system the reference station is installed at the center station. This minimizes the number of sites but the center station transmitter overloads the local reference station receiver which makes it necessary to reduce the receiver's gain. This results in the end station signal being too weak to produce a usable beat frequency with the center station signal unless the base line is short. A short base line limits the coverage of the system for a given accuracy. Another prior system avoids the problem of overloading the reference station receiver by using a switching arrangement which causes each end station alternately to operate as a reference station for the heterodyning center station and opposite end station. The defect with this method is that increased sky wave interference is present in the beat frequency detected at the reference station receiver due to the extra long propagation path from end station to end station. This increased sky wave signal reduces the accuracy of the system.

Since each lane has the same scalar phase variation transversely across it, another consideration in the practical use of these systems as true navigation systems is that a suitable means must be available to permit resolution of the ambiguities that exist among the hyperbolic lanes, i.e., a means must be provided of determining in which lane the navigating craft having the navigation receiver is operating. Most prior systems do not provide any integral means for resolving these ambiguities. Certain prior systems incorporate means of reducing the ambiguities to larger areas of ambiguity than the individual Fine hyperbolic lanes by use of multiple-frequencies (additional band width method) or by use of multiple base lines (additional geometry method). The system that is the subject of this invention utilizes the multiple-frequency method; in effect, operating two Fine hyperbolic line-of-position systems in parallel, with the stations of the two systems located at the same geographic points but so spaced in frequency that a beat frequency between the two Fine systems also provides superimposed Coarse hyperbolic lines. Measurement of a line-of-position in a Coarse lane is made to identify the particular Fine hyperbolic lane the navigating vessel is in. Then, measurements are made in one of the Fine systems to increase the accuracy of the navigation fix. In a practicable system, the width of a Coarse lane covers about 5 to 25 Fine lanes. The number of Fine lanes in a Coarse lane may be determined by proper choice of the carrier frequencies for the two Fine systems. The ambiguities among the Coarse lanes are usually resolved by use of other available and known navigation aids. Special charts are used by the navigator to relate the measured phase-position to geographic position.

The navigational accuracy of such a system is determined, among other things, by the radio frequency band used, the instrumental accuracy of phase measurement of the navigation receiver, the extent of interference to the desired ground wave signals by noise and reflected sky wave signals, and the position of the navigating craft in the coverage of the system.

In connection with instrumental accuracy, the instrumental phase measurement accuracy does not change appreciably over the range of frequencies involved but the distance error represented by a given phase measurement error varies inversely with frequency. The instrumental "distance errors," therefore, can be reduced by use of higher radio frequencies for operation of the system. However, other considerations arise. It is practically essential to use ground wave signals in order to obtain high accuracy; and the use of higher radio frequencies tends to limit the range and accuracy of the system because of the increased attenuation of the ground wave signals by earth of poor conductivity, and the increased effects of sky wave signals upon the weaker ground wave signals with increased distance. Also, because of the expansion of the hyperbolic lanes with distance from the base line, the base line should be at least as long as the maximum distance of coverage desired in order to reduce the geometric magnification of errors.

It is an object of this invention to provide a generic series of continuous wave phase comparison hyperbolic navigation patterns usable by any number of craft, through which patterns a craft's position can be accurately related to a geographical position.

It is an object of this invention to provide new and novel equipments and arrangements for resolving ambiguities among hyperbolic lanes in such systems.

It is an object of this invention to accomplish resolution of ambiguities with use of the minimum number of radio frequency channels and with the least restrictive relationship between the radio frequency channels used.

It is an object of this invention to provide novel equipments and arrangements of stations which will permit use of base lines up to twice the length of those of prior methods without increased errors arising because of sky wave signals contaminating the heterodyning signals as received at the reference stations. The longer base line has the advantage of increased accuracy at the longer distances from the stations because of lowered geometric magnification of errors.

It is an object of this invention to provide equipments and patterns requiring a minimum number of radio channels, and having a flexibility of arrangement such that the number of station sites, equipments and radio frequencies required can also be minimized, depending on the extent and accuracy of navigational coverage desired. In the preferred embodiment this is accomplished as follows:

(a) For relatively small areas of coverage, for which short base lines, each of length X, can be used, only three station sites need be used and the reference station may be installed at the center station.

(b) For larger areas of coverage, for which somewhat longer base lines are required, each of length about 2X, four station sites are used, with the reference station installed at the fourth site, which preferably should be about equi-distant from the heterodyning center and end stations. Removing the reference station from the vicinity of the center station averts overloading the reference station receiver and permits lengthening the base lines.

(c) For largest area of coverage, requiring the longest practical base lines of the order of 3 to 5X, to maintain system accuracy five sites should be used, with a separate reference station installed at or near the midpoint of each base line between the center and two end stations.

(d) Depending on requirements, the system stations when installed in any of the three configurations described in a, b, c, above, may be installed so as to provide only Fine hyperbolic lines-of-position, and use only two radio frequency channels. A simplified navigation receiver can be utilized to provide information for the Fine hyperbolic line-of-position system only. At any later time, this system can be modified to add additional equipment required to convert the system to provide both Coarse and Fine lines-of-position. In this case three radio frequency channels would be required; and the simplified receiver would require modification which, in accordance with the invention, can easily be done by "plug in" or tying connections.

Other objects and many of the attendant advantages of this invention will be readily appreciated as the same becomes better understood by reference to the following detailed description and considered in connection with the accompanying drawings in which like reference symbols designate like parts throughout the figures thereof and wherein:

Fig. 3 is a simplified symbolic diagram of a navigation receiver; and

Fig. 4 is a simplified symbolic diagram of a reference station as required for smaller area-of-coverage versions of the system.

Figure 1:
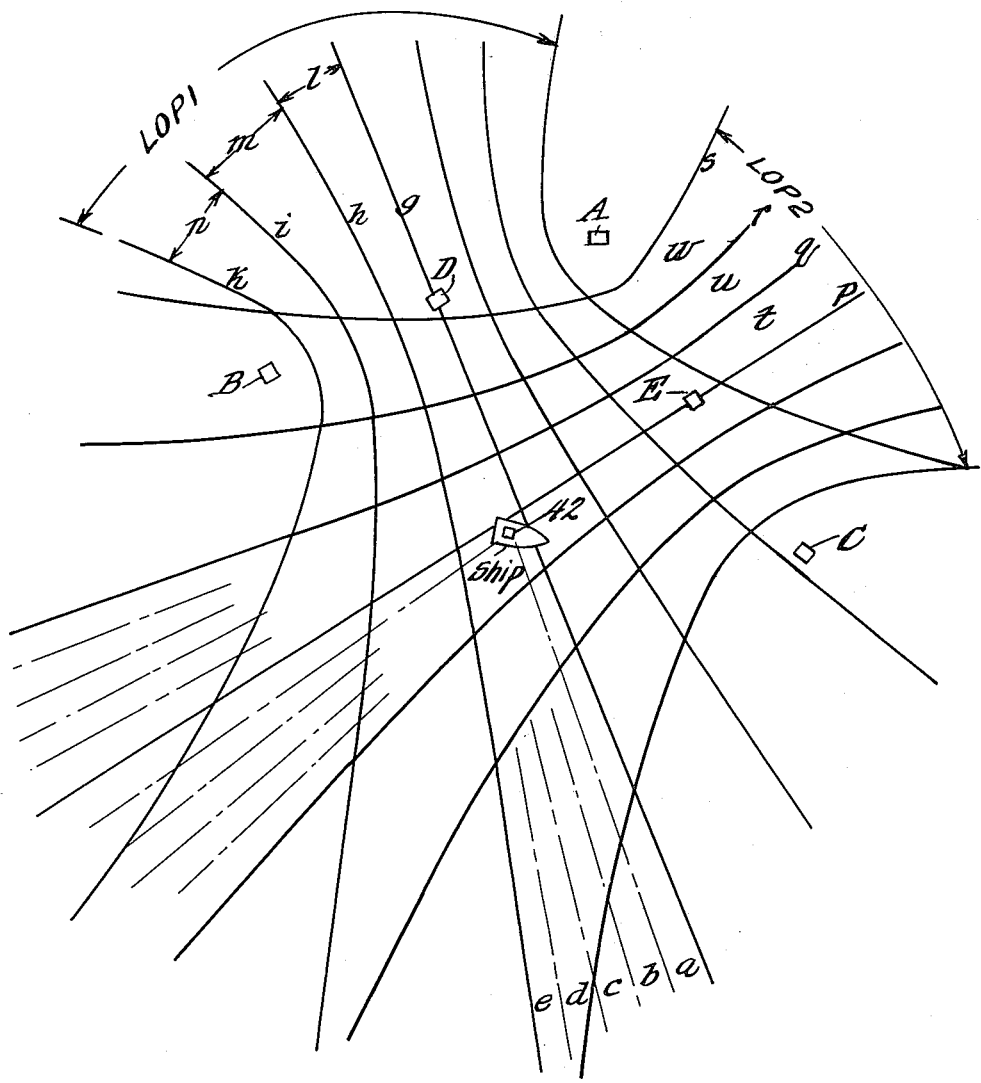
Fig. 1 is a simplified diagram explanatory of an overall system installation, but having only a few lines-of-position illustrated in the interests of clarity.
Figure 2:
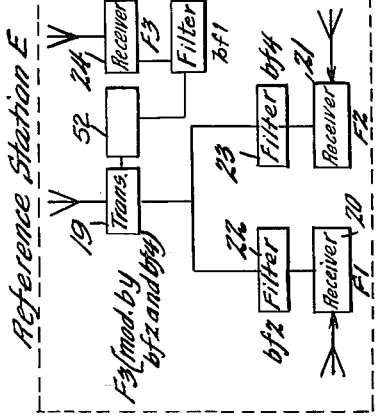
Fig. 2 is a simplified symbolic schematic diagram of a transmitter system for largest area of coverage.
Figure 2:
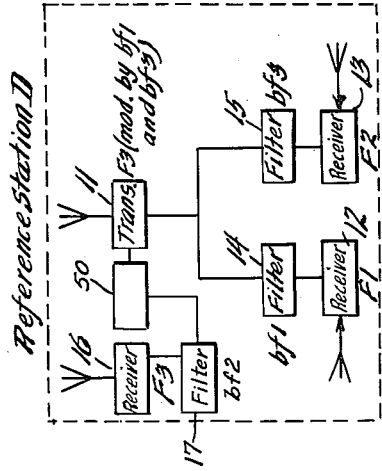
Figure 2:
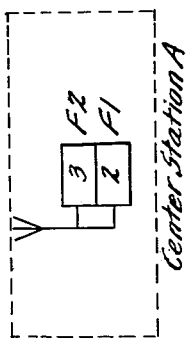
Figure 2:
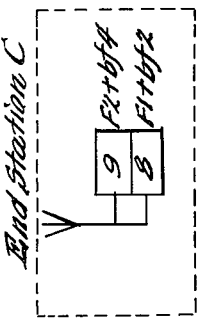
Figure 2:
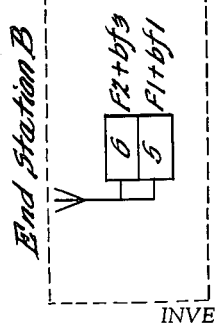

With respect to largest area of coverage, and referring now to Figs. 1 and 2, reference symbol A designates a transmitter station, also known as the center station, which emits from its antenna radio frequencies F1 and F2 within channels F1 and F2 and produced by transmitters 2 and 3 respectively. Reference symbol B refers to one of the end stations and comprises transmitters 5 and 6 which provide radio frequencies of magnitudes $F1+bf1$ and $F2+bf3$, respectively, in channels F1 and F2, respectively. Reference symbol C designates the second end station comprising transmitters 8 and 9 which provide radio frequencies of magnitudes $F1+bf2$ and $F2+bf4$, respectively, in channels F1 and F2, respectively. These transmitters are relatively fixed and all emit continuous wave signals that are not keyed or modulated in any manner.

The general notation $F+bf$ designates a discrete radio frequency different from F by a low frequency equal to $bf$ so that $bf$ can also be said to be a beat frequency. Although the correct frequency could be produced by a frequency either above (+) or below (−) the frequency F by an amount equal to the desired beat frequency, for simplicity, the general form $F+bf$ or similar expressions are used herein with the understanding that the second term may also be subtractive.

The transmitters A, B and C produce signal phase-patterns on the earth's surface that can be viewed as a signal lattice of crossing lines and lanes. Fig. 1 illustrates a hyperbolic signal lattice of patterns created by the transmitter equipment which is located in a V-arrangement with station A at the apex and stations B and C at the ends.

There is a first set of hyperbolic lines-of-position $g$, $h$, $i$, $k$, etc., which lines define the boundaries of Coarse lanes $l$, $m$, $n$, etc., therebetween at one side of line $g$. Line $g$ is the perpendicular bisector of the straight base line joining stations A and B. The lanes $l$, $m$, $n$, gradually increase in width in a direction outwardly or away from the line joining the stations A and B. A similar set of lanes exists on the other side of line $g$. Although three Coarse lanes are identified and shown for convenience; in practice the number of lanes may be and usually will be greater.

A second set of hyperbolic lines-of-position $p$, $q$, $r$, $s$, etc., define Coarse lanes $t$, $u$, $w$, etc., crossing the base line joining stations A and C, on both sides of the baseline bisector $p$.

The set of null lines $g$, $h$, $i$, $k$, . . . are part of a first pattern established by stations A and B, and the lines $p$, $q$, $r$, $s$, . . . are part of a second pattern established by stations A and C.

Lines $g$, $h$, $i$, $k$, . . . . define Coarse lanes in the first pattern, and additional lines provide Fine lanes $a$, $b$, $c$, $d$, $e$ in each Coarse lane for this pattern which is identified as LOP1. Similarly additional lines provide Fine lanes in each Coarse lane of the second pattern which is identified as LOP2. For clarity only a few partial lines of position for the Fine lanes are shown in a Coarse lane of each pattern in Fig. 1; it being understood that Fine lanes of position extend longitudinally along each Coarse lane of each pattern of position, and the number in each Coarse lane is dependent on the frequencies used.

There is a positive or negative half-wave phase variation across each lane of each set or pattern of lanes. By starting from a known lane and by counting the number of times the full variations repeat while traveling a distance from a known lane, and by noting the phase or line-of-position for each pattern at its immediate location in its immediate lane, a ship having a navigational receiver 42 can fix or orient itself with the aid of charts available for the purpose.

The LOP1 pattern crosses the base line between stations A and B. The LOP2 pattern crosses the base line between stations A and C. Hence, a ship can fix or orient itself by knowing which Coarse and Fine lanes of the pattern LOP1 and LOP2 it is in. Stated differently, it obtains a fix from its crossing lines-of-position.

The Fine hyperbolic lines-of-position of the pattern LOP1 corresponds to the beat frequency $bf1$ of the signals F1 and $F1+bf1$ from transmitters 2 and 5 at stations A and B, respectively. The Fine hyperbolic lines-of-position of the pattern LOP2 corresponds to the beat frequency $bf2$ of the signals F1 and $F1+bf2$ from transmitters 2 and 8 of stations A and C, respectively. It should be understood that the operating system can be arranged to read Fine lines-of-position in either the F1 or F2 channel, or, if desired, at considerable extravagance of equipment, in both the F1 and F2 channels. The transmitters A, B and C are sufficient for patterns of Fine lines-of-position only.

In accordance with the invention, Coarse lines are utilized, defining Coarse lane as one which contains several Fine lanes and perhaps an additional fraction of a Fine lane.

The Coarse hyperbolic lines-of-position for the Coarse lanes are obtained in a manner subsequently described. The beat frequencies $bf3$ and $bf4$ are utilized therefor, although they are not directly associated with any particular hyperbolic lines-of-position. Beat frequency $bf3$ is produced by signals F2 and $F2+bf3$ from transmitters 3 and 6 at stations A and B, respectively; and beat frequency $bf4$ is produced by signals F2 and $F2+bf4$ from transmitters 3 and 9 at stations A and C, respectively.

For the largest and most comprehensive area-of-coverage embodiment of the invention, a pair of fixed reference transmitter stations D and E are introduced, with station D substantially midway between stations A and B, and station E substantially midway between stations A and C, as indicated in Figs. 1 and 2.

Broadly, the reference stations D and E transmit on the F3 channel. They provide the reference signals with which the beat frequencies associated with the lines-of-positions can be compared for phase determination in the navigation receiver 42. The reference station D transmits the reference signals associated with beat frequencies from station A and B. The reference station E transmits the reference signal associated with the beat frequencies transmitted from stations A and C.

The reference station D comprises a transmitter 11 which produces a signal frequency F3 modulated by frequencies $bf1$ and $bf3$. The station further comprises receivers 12 and 14 to receive channels F1 and F2, respectively, and filters 14 and 15 adjusted to pass frequencies $bf1$ and $bf3$, respectively; and also comprises a receiver 16 to receive channel frequency F3, and a filter 17 to pass the $bf2$ frequency. The operation of transmitter 11 is under partial control of the signal passed to it through filter 17 from receiver 16 by means of switching circuit 50.

The reference station E comprises a transmitter 19 which produces a signal frequency F3 modulated by frequency $bf2$ and $bf4$. The station further comprises receivers 20 and 21 to receive channels F1 and F2, respectively, and filters 22 and 23 adjusted to pass frequencies $bf2$ and $bf4$ respectively; and also comprises a receiver 24 to receive channel F3, and a filter 25 to pass the $bf1$ frequency. The operation of transmitter 19 is under partial control of the signal passed to it through filter 25 from receiver 24.

The two transmitters 11 and 19 at the stations D and E transmit alternately on channel F3 at a switching rate of a few cycles per second. Numerous methods known to the art may be used to control the alternate operation of these two stations. A suitable version is briefly described in connection with Fig. 2. Each of the transmitters 11 and 19 at reference stations D and E, respectively, may contain an electronic switching control circuit 50 and 52 such that, when activated by a suitable trigger signal, a transmitter will be turned on for a short period equivalent to approximately one-half of a switching period, after which the transmitter automatically turns off. Now assume that both transmitters are initially off and that the control circuit 52 of transmitter 19 at station E is activated causing transmitter 19 to emit. At station D, receiver 16 receives signals from transmitter 19, and detects as modulation and passes through the $bf2$ band pass filter 17, the beat frequency $bf2$ which continues to the switching control circuit 50 in transmitter 11. When transmitter 19 at station E turns off automatically at the end of its operating period, the cessation of signal through filter 17 causes the switching control circuit 50 in transmitter 11 at station D to turn on this transmitter 11, which then emits for its predetermined period. Receiver 24 and $bf1$ band pass filter 25 at station E detect and select beat frequency $bf1$ when transmitter 11 is emitting to cause transmitter 19 to transmit again after transmitter 11 ceases. This cycle of operation is thereafter repeated.

Another version for automatically controlling the alternate operation of reference transmitters 11 and 19 may be the keyed transmission of a low frequency tone superimposed on the carrier frequency of any one of the stations A, B and C. For example, the tone might be keyed on and off cyclically as mark and space signals on the channel F1 of the transmitter 2 on station A. Suitable receivers such as 16 and 24 at stations D and E are arranged to receive this keyed tone and are provided with means to cause the switching control circuits in transmitters 11 and 19 to be properly actuated in synchronism with the keying of the tone. An objection to this alternate method is, however, the added equipment required for the otherwise simple cw transmitter 2 at station A, and the possibly wider band width frequency allocation required for the F1 channel because of the added modulation.

During the periods in which they are operating, reference transmitters 11 and 19 transmit signals on the third channel F3 modulated by the same beat frequencies provided at the end stations B and C, respectively; the third channel being used for ambiguity resolution. For transmitter modulation purposes at station D, this station has receivers 12 and 13 for the F1 and F2 channel, these receivers feed, respectively, band pass filters 14 and 15 which pass frequency $bf1$ of the F1 channel, and frequency $bf3$ of the F2 channel, respectively. The signals from filters 14 and 15 modulate the transmitter 11. For transmitter modulation purposes at station E, this station has receivers 20 and 21 for the F1 and F2 channels, respectively, feeding, respectively, band pass filters 22 and 23 which pass frequency $bf2$ of the F1 channel and frequency $bf4$ of the F2 channel, respectively. The signals from filters 22 and 23 modulate the transmitter 19. The different pass filters 14, 15, 22 and 23 are preferably comparatively sharp so as to separate and materially reduce noises and other heterodyne or interfering signals from the associated transmitters.

The equipment thus far described details the essential components of the relatively fixed "shore" stations for the largest coverage or range system. The essential components of a navigation receiver 42 on a vessel for cooperation with the transmitter components of Fig. 2 are indicated in Fig. 3.

The navigation receiver 42 has heterodyne receivers 26, 27 and 28 for receiving channels F1, F3, and F2, respectively. The receivers 26, 27 and 28 are connected to a common antenna.

Receiver 26 is tuned to the F1 channel and receives signals from transmitters 2, 5, and 8, of stations A, B and C, respectively, which heterodyne together and, after detection, produce an output of low audio frequencies equal to $bf1$ and $bf2$. It will be recognized that the sum and difference beats of the several heterodyne frequencies and possibly other interfering signals and noise may also be present in the output of the receiver. It is the purpose of audio frequency band pass filters 29 and 30 to separate the difference frequency beats, $bf1$ and $bf2$, respectively, from any such undesired signals in the output of receiver 26 and to pass these beat frequencies to one terminal of their respective phase measurement circuits and indicators 31 and 32. The beat frequency $bf1$ is associated with the Fine lines of LOP1; and $bf2$ with the Fine lines of LOP2. Before a phase reading can be indicated, the other terminals of the phase meters 31 and 32 must be supplied with the appropriate reference signals. Reference signals are received by receiver 27 as modulation on the F3 carriers of the reference station transmitters D and E. After detection in receiver 27, the Fine line-of-position reference signals $bf1$ and $bf2$ are selected by filters 33 and 34, respectively, and fed to the other terminals of phase meters 31 and 32, respectively. Phase meter 31 now will indicate that the navigating craft is somewhere along a hyperbolic line in a Fine lane in hyperbolic lattice LOP1. In a like manner, phase meter 32 will now indicate the position of the craft to be somewhere along a hyperbolic line in a Fine lane in hyperbolic lattice LOP2.

These indicators 31 and 32 do not show which of the Fine lanes in each lattice the craft is in unless the craft started using the system from a known position, in which case an integrating lane count dial on each meter may show the number of Fine lanes traversed since starting use of the system, as is known in the art. It can be seen, therefore, that ordinarily the initial position of the navigating craft must be known to within distances represented by the widths of the Fine hyperbolic lanes, and that the navigating craft must not subsequently lose the system signals or the lane count may be in error. By use of Coarse lane information, as described in the following paragraphs, the accuracy with which the initial position of the navigating craft must be known is considerably decreased.

In accordance with the invention, the additional heterodyne signals required to provide Coarse line-of-position data are transmitted by transmitters 3, 6 and 9 of stations A, B and C, respectively, and received in receiver 28 of the navigation receiver 42. This receiver 28 is tuned to the F2 channel, and its output will contain the difference frequency beats, $bf3$ and $bf4$, as well as the sum beats and possibly other interfering signals and noise.

Outputs of both receivers 26 and 28 are directly fed to mixer 35 which performs the function of mixing the applied F1 and F2 signals by mixing their beat frequencies. The output of the mixer 35 contains all the signals present in the outputs of receivers 26 and 28, i.e., the heterodyne sums and differences and possibly other interfering signals and noise. The signals that are of particular interest are those that represent the difference beats between the F1 and F2 channels for both hyperbolic lattices LOP1 and LOP2. The signals associated with Coarse LOP1 are $bf1$ and $bf3$; their difference ($bf1-bf3$) is designated $bf5$, which is selected by pass filter 36 and fed to one side of phase meter 37. The signals associated with Coarse LOP2 are $bf2$ and $bf4$; their difference ($bf2-bf4$) is designated $bf6$, which is selected by filter 38 and fed to one side of phase meter 39.

Before a phase reading can be indicated by the phase meters 37 and 39, the other terminals of the phase meters must be supplied with appropriate reference signals which are present in the output of reference receiver 27 which receives signals from reference stations D and E. Filter 40 selects reference signal $bf1-bf3$, designated $bf5$, and feeds this signal to phase meter 37. Filter 41 selects reference signal $bf2-bf4$, designated $bf6$, and feeds it to phase meter 39. Phase meters 37 and 39 will now indicate the navigating craft to be somewhere along a hyperbolic line in a Coarse hyperbolic lane in each lattice, LOP1 and LOP2.

By suitable choice of frequencies for the channels F1 and F2 and by designing the equipment to have appropriate instrumental accuracy, the accuracy of readings on the Coarse meters will be sufficient to indicate a Coarse lane. Since there are fewer Coarse than Fine lanes, the chance of error in ascertaining the correct Fine lane is greater than that for ascertaining the correct Coarse lane.

The ambiguities among Coarse lanes can be resolved by some other navigation aid. By knowing which Coarse lane the navigating craft starts using the system, the navigator sets the Coarse lane integrator dials to the correct reading. Thereafter, the lane-integrator dials count the number of Coarse lanes transversed provided the systems signals are not interrupted long enough for the craft to traverse one or more lanes.

It will be recognized that the above described method of generating Coarse lanes by mixing two Fine lane systems F1 and F2 in an electronic mixer could also be accomplished by other suitable means such as a mechanical differential between the navigation receiver indicators of the two Fine systems.

The system described lends itself to simplification for small area of coverage when navigation requirements and layout permit in which case only Fine LOP patterns need be transmitted. For such a system both the transmitter equipment and the receiver equipment can be simplified, since only the $bf1$ and $bf2$ beat frequencies on a single channel, and a reference signal on a second channel are needed for the Fine LOP lattice. This means that the transmitters 3, 6 and 9 at stations A, B and C can be omitted, and the receiver and filter combinations 13 and 15, and 21 and 23 at reference stations D and E can also be omitted or made inoperative if already installed. At the receiver 42, all the equipment to the right of the central broken dotted line of Fig. 3 can be omitted. It will be recognized that by building into one unit all elements to the left of this vertical broken line, a navigation receiver capable of providing only Fine LOP lattice is available. By building into another unit all elements to the right of the vertical broken line and by making suitable simple provisions for interconnecting the two units, as for example by plug connections 43, the Coarse LOP indicators can be added to the Fine LOP indicators at will, as desired or as demanded by the navigation requirements. If after having installed only the elements required for the Fine system it were found desirable to provide Coarse LOP data, this could be accomplished by simply adding the elements therefor.

As an illustration of the application of the invention, a largest area-of-coverage embodiment of the invention used the following parameters:

$F1=450,000$ cycles per second; $F2=480,000$ cycles per second; $F3=432,000$ cycles per second; $F1+bf1=450,210$ cycles per second; $F1+bf2=450,275$ cycles per second; $F2+bf3=480,370$ cycles per second; $F2+bf4=480,450$ cycles per second; $bf5=160$ and $bf6=175$ cycles per second; the distance between stations A and B=85 miles; the distance between stations A and C=80 miles; the distance between stations B and C=162 miles.

The reference stations D and E were midway between their associated pairs of stations A and B, and A and C respectively. However, the references stations need not be exactly midway, but can be displaced with satisfactory results of about 10–15%, more or less, from the midpoint distances. However, the exact midpoints give best results.

Reliable position fixing by a ship can be obtained with the specific systems of the foregoing parameter values with the ships at distances of up to one hundred and fifty miles, more or less, from the center station. It is to be understood, of course, that the invention is not limited to the foregoing particular system or values.

The described largest area coverage requires five fixed transmitter stations A, B, C, D and E, the last two of which are reference stations. For intermediate area-of-coverage versions of the invention, the three main stations A, B and C with but one reference station need be used. In the one reference station version of the system, switching control receivers 16 and 24 and filters 17 and 25 of the stations D and E are not required, nor are beat frequency receivers 20 and 21 required. The remaining elements of the two reference stations are combined into one station, as shown in Fig. 4, which may be either the station D or the station E.

With reference to Fig. 4, the transmitter 11' transmits continuously on carrier F3 with the carrier modulated continuously by beat frequencies $bf1, bf2, bf3$ and $bf4$. For modulation, beat frequencies $bf1$ and $bf2$ are received by receiver 12' for channel F1, and are selected by filters 14' and 22', respectively; and beat frequencies $bf3$ and $bf4$ are received by receiver 13' for channel F2 and selected by filters 15' and 23' respectively.

The operation of the navigation receiver 42 in Fig. 3, is the same in both single and double reference station versions of the system, since both versions transmit the same carriers F1, F2 and F3. However, different charts are required for locating geographic positions.

Obviously many modifications and variations of the present invention are possible in the light of the above teachings. It is therefore to be understood that within the scope of the appended claims the invention may be practiced otherwise than as specifically described.

What is claimed is:

1. A radio position-fixing navigation system comprising three relatively fixed spaced stations A, B and C respectively, each of said stations having a transmitter means, the transmitter means at station A having means for transmitting signals in channels of frequencies F1 and F2, the transmitter means at station B having means for transmitting signals of frequencies $F1+bf1$ and $F2+bf3$, and the transmitter means at station C having means for transmitting signals of frequencies $F1+bf2$, and $F2+bf4$; where F1 and F2 represent different carrier frequency values and $bf1, bf2, bf3$ and $bf4$ represent different low frequency values to be algebraically added to the F1 and F2 values as indicated; and a pair of relatively fixed spaced reference stations D and E, reference station D having transmitter means for transmitting signals of frequency $F3+bf1+bf3$, and reference station E having transmitter means for transmitting signals of frequency $F3+bf2+bf4$; where F3 represents a carrier frequency value different than F1 and F2; the stations D and E being approximately midway between stations A and B, and A and C, respectively.

2. A system as defined in claim 1 but further characterized by means at said reference stations for rendering them cyclically alternately operable.

3. A system as defined in claim 1 further combined with a mobile receiver station having heterodyne receivers for frequencies F1, F2 and F3, pass filters for combinations of frequencies $bf1, bf2, bf3$ and $bf4$, and phase indicators operable by said combinations.

4. A radio position-fixing navigation system comprising three relatively fixed spaced stations, a first of said stations having a transmitter means for transmitting a signal on a first carrier frequency and a signal on a second carrier frequency, a second of said stations having transmitting means for transmitting a pair of different signals slightly different from said first and second carriers, respectively, a third of said stations having transmitter means for transmitting a pair of different signals slightly different from said signals at said second station, relatively fixed reference transmitter means for transmitting a reference signal on a third carrier modulated in frequency by a combination of the differences in frequencies of the signals of the first three said stations.

5. A radio position-fixing navigation system comprising three relatively fixed spaced stations, a first of said stations having a transmitter means, for transmitting a signal on a first carrier frequency and a signal on a second carrier frequency, a second of said stations having transmitting means for transmitting a pair of different signals slightly different from said first and second carriers, respectively, a third of said stations having transmitter means for transmitting a pair of different signals slightly different from said signals at said second station, a first relatively fixed reference station having transmitter means for transmitting a first signal on a third carrier modulated in frequency by a combination of differences in frequencies transmitted by said first and second station, and a second relatively fixed reference station having a transmitter means for transmitting a signal on said third carrier modulated in frequency by a combination of differences in frequencies transmitted by said first station and said third station.

6. A radio position-fixing navigation system comprising three relatively fixed spaced stations, a first of said stations having a transmitter means for transmitting a signal on a first carrier frequency and a signal on a second carrier frequency, a second of said stations having transmitting means for transmitting a pair of different signals slightly different from said first and second carriers, respectively, a third of said stations having transmitter means for transmitting a pair of different signals slightly different from said signals at said second station, and relatively fixed transmitter means for transmitting a number of reference signals characterized by frequencies slightly different from any of said frequencies.

7. A system as defined in claim 6, but further characterized by said reference signals being two different signals, a relatively fixed spaced transmitting station being provided for each reference signal, each station of said system being spaced from the other stations of said system.

8. A system as defined in claim 6 but further characterized by single reference station having said transmitting means for said reference signals, said reference station being approximately midway between a pair of said stations.

9. A system as defined in claim 5 but further characterized by the combination thereof with a mobile receiver means having means for receiving said signals and providing output signals representative of the differences in said transmitted frequencies, and phase indicating means operated by said output signals.

10. A system as defined in claim 6 but further characterized by the combination thereof with a mobile receiver means having means for receiving said signals and providing output signals representative of the differences in said transmitted frequencies, and phase indicating means operated by said output signals.

References Cited in the file of this patent
UNITED STATES PATENTS

| | | |
|---|---|---|
| 2,148,267 | Honore | Feb. 21, 1939 |
| 2,652,559 | Hawkins | Sept. 15, 1953 |
| 2,730,714 | Mahoney | Jan. 10, 1956 |